United States Patent Office 3,017,240
Patented Jan. 16, 1962

3,017,240
LINEAR INORGANIC POLYMERS AND PROCESS OF PREPARING THE SAME
Richard David Cramer, Landenberg, Pa., assignor to E. I. du Pont de Nemours and Company, Wilmington, Del., a corporation of Delaware
No Drawing. Filed Dec. 19, 1958, Ser. No. 781,472
6 Claims. (Cl. 23—14)

This invention relates to new inorganic polymers. More particularly, it relates to new carbon-free polymers containing a chain of alternating nitrogen and sulfur atoms, and to a method of preparing these polymers.

Very few linear inorganic polymers containing sulfur-nitrogen linkages have been reported in the literature. The synthesis of new polymers of this type was therefore a desirable goal, both for the purpose of advancing scientific knowledge and of providing new structures having the technically valuable properties, such as thermal stability and resistance to combustion, generally associated with inorganic polymers.

The new products made available by this invention are linear polymers containing a plurality of recurring units having the structure

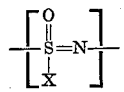

where X stands for a fluoro or amino radical, i.e., is F or $NH_2$. These polymers are prepared by maintaining in contact anhydrous ammonia and thionyl tetrafluoride, $SOF_4$, in a molar ratio of ammonia to thionyl tetrafluoride at least 0.5:1 until reaction has taken place, and separating the resulting polymeric product.

Thionyl tetrafluoride, also called sulfur oxytetrafluoride, is a gas boiling at —49° C. It can be prepared by fluorination of thionyl fluoride, as described, for example, by Dudley, Cady and Eggers in J. Am. Chem. Soc. 78, 1553 (1956). The other reactant in this process is ammonia, which is used in substantially anhydrous form. For this purpose, the commercially available ammonia is satisfactory without special drying or purification.

The reaction between thionyl tetrafluoride and ammonia can be represented, at least formally, by the equations:

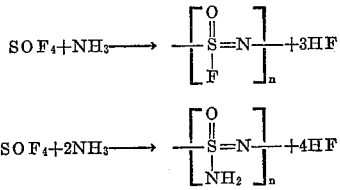

However, it is by no means necessary to employ the reactants in the relative proportions called for by the above equations. Appreciable polymer formation takes place when the molar ratio $NH_3/SOF_4$ is as low as 0.5:1. On the other hand a large excess of ammonia, e.g., up to a molar ratio $NH_3/SOF_4$ of 15:1 or higher, can be used in the novel process of the invention. Part at least of the hydrogen fluoride formed is found as ammonium fluoride or ammonium bifluoride.

The reaction takes place, although slowly, at temperatures as low as 0° C. or even lower. It is more practical to operate at temperatures at least as high as ordinary room temperature, that is, at least 20° C. There is no critical upper temperature limit, provided the disproportionation temperature of thionyl tetrafluoride, which is about 450° C., is not exceeded. The preferred temperature range is from 20° C. to 200° C.

Since both reactants are gaseous at ordinary temperature, the reaction is conveniently carried out in sealed vessels and at the autogenous pressure developed by the reactants, although additional pressure from an inert gas such as nitrogen can be used if desired. For this purpose, corrosion-resistant vessels can be used, such as those made of stainless steel or of the nickel-iron-molybdenum alloy known commercially as "Hastelloy C." The vessels are preferably, though not necessarily, agitated during the reaction period. Appreciable polymer formation takes place, even at room temperature, within a few minutes after the reactants are mixed, and in general no further reaction occurs after a few hours' contact. The reaction can also be carried out at or near atmospheric pressure, for example by passing the mixed gases through a heated tubular reactor and, if necessary, recycling the unreacted gas mixture.

The polymers can be separated from the reaction mixture containing them simply by washing or extracting the total non-volatile reaction product with water to remove the ammonium fluoride and other by-products, thus leaving the polymeric materials, which are water-insoluble solids.

The nature of the polymeric product obtained in this reaction depends, at least in part, on the relative proportions of the reactants. When the molar ratio of ammonia to thionyl tetrafluoride does not exceed about 3:1, the reaction product is a poly(fluorooxosulfur nitride), that is, a polymer containing essentially or exclusively fluorooxonitrido sulfur units,

When the molar ratio $NH_3/SOF_4$ exceeds 3:1, particularly when it is near or above 4:1, the reaction product is a poly(aminooxosulfur nitride), that is, a polymer containing essentially aminooxonitrido sulfur units,

This latter type of polymer, however, can and often does contain minor amounts of fluorine, indicating the presence therein of some fluorooxonitrido sulfur units.

The nature of the product is also influenced to some extent by the reaction temperature. At a given $NH_3/SOF_4$ ratio above about 3:1, a relatively low reaction temperature, e.g., 20–75° C., tends to give polymers containing somewhat more fluorine, i.e., more

units, than higher temperatures, e.g., above 75° C.

Both of the polymers produced by the reaction of ammonia with thionyl tetrafluoride have the same basic structure. The polymers comprise a chain of alternating nitrogen atoms and hexavalent sulfur atoms, the latter bearing extra-linear doubly bonded oxygen atoms and either fluorine atoms or amino groups. This type of structure is supported by the evidence of elemental and infrared spectral analysis. The chains are probably terminated by amino groups, although this has not been definitely established. The molecular weight of these polymers is difficult to determine accurately, in view of their insolubility in the usual solvents, but their physical properties and inherent viscosity, whenever the latter can be determined, indicate that it is at least 10,000 and usually well above that value.

Both the poly(fluorooxosulfur nitride) and the poly(aminooxosulfur nitride) are amorphous solids, characterized by thermal stability up to temperatures of 300° C. or higher and resistance to combustion. Poly(fluorooxosulfur nitride) varies in consistency from a powdery solid to a tough, somewhat rubbery resin. It is unaffected by water and soap solutions even at the boiling point. It is unaffected by hot aqueous acids and it is only slowly hydrolyzable by hot aqueous alkali. It is insoluble in the common organic solvents, but can be dissolved in phosphorus oxychloride. Poly(aminooxosulfur nitride) is a hard, tough solid with a horn-like appearance. It is swollen but not attacked by water and it is very resistant to acid or alkaline hydrolysis. It is also insoluble in the common organic solvents. Both polymers are essentially infusible, in the sense that they only soften without forming a true liquid phase on heating. They can be shaped or molded at temperatures above their softening points, and their remarkable physical and chemical inertness confers valuable properties to the objects thus fabricated.

The invention is illustrated in greater detail in the following examples, in which parts are by weight unless otherwise indicated.

*Example I*

A stainless steel vessel having a capacity of 400 parts by volume is evacuated, cooled to −80° C. and charged with 8 parts of anhydrous ammonia and 31 parts of thionyl tetrafluoride ($NH_3/SOF_4$ mole ratio 2:1). The mixture is heated at 100° C. with agitation for 14 hours. At the end of this time the reactor is cooled and opened. It is found to contain 1.5 parts of gas, principally sulfuryl fluoride (probably resulting from adventitious moisture), and a mixture of a syrupy liquid and rubbery solid in which crystalline ammonium fluoride is imbedded. The rubbery material is freed of the other products by washing with water until the water is no longer discolored.

The washed product is relatively soft at room temperature and has a tough, gummy consistency which is retained to temperatures above 125° C. It is unaffected by water, although it hydrolyzes in several hours in hot 10% aqueous sodium hydroxide. It softens but does not dissolve nor disintegrate in boiling toluene or xylene; in fact, it is insoluble in all the common organic solvents. It retains water rather tenaciously, but the adsorbed water can be removed by drying over phosphoric anhydride.

Elemental analyses show that this polymer contains sulfur, nitrogen and fluorine in the molar ratio 1:1:1. The infrared absorption maxima at 7.4, 8 and 12μ are consistent with the structure

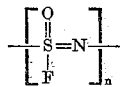

The structure is further supported by the fact that practically no ammonia is evolved during hydrolysis, indicating that the nitrogen is not present in amino groups. The solid hydrolysis product contains nitrogen and sulfur in 1:1 molar ratio, indicating that the polymer chain is not cleaved by hydrolysis and contains nitrogen-sulfur units.

The reaction described in this example can also be carried out in an inert solvent, such as toluene, with no appreciable changes in the properties of the resulting polymer.

*Example II*

A mixture of 12 parts of ammonia and 31 parts of thionyl tetrafluoride ($NH_3/SOF_4$ mole ratio 2.8:1) is treated as in Example I. There is obtained 38 parts of a slurry of liquid, crystalline solid and rubbery polymer. This product is washed thoroughly with water to obtain 8 parts of a polymeric material which is tougher and more elastic than the product of Example I. It softens without melting at elevated temperature. Thus, it can be pressed into films at 125° C., and it flows under relatively slight pressure at 150° C.

*Analysis.*—Calcd. for $(SOFN)_n$: F, 23.44; N, 17.28; S, 39.55. Found: F, 22.34; N, 18.26; S, 38.84.

A polymer similar to that of this example was found to have an inherent viscosity of 0.53 in phosphorus oxychloride solution at 0.1% concentration. This value is estimated to correspond to a minimum of 250 monomer units, i.e., a molecular weight of at least 20,000.

*Example III*

A mixture of 16 parts of ammonia and 31 parts of thionyl tetrafluoride ($NH_3/SOF_4$ mole ratio 4:1) is heated in a bomb at 100° C. for 15 hours. The resulting solid mixture of polymeric material and ammonium fluoride is washed with water. The polymer becomes swollen but does not dissolve and is thus separated from the ammonium fluoride. The dried polymer (8 parts) is a hard, tough solid. Upon analysis, it is found to contain, besides a small amount (1.64%) of fluorine, sulfur, oxygen, nitrogen and hydrogen in the approximate atomic ratio 1:1:2:2. These data correspond to the structure

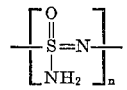

The infrared absorption spectrum was also consistent with this structure.

*Example IV*

A mixture of 16 parts of ammonia and 31 parts of thionyl tetrafluoride is heated in a bomb at 50° C. for 14 hours. The reaction product is freed of ammonium fluoride by washing with water. There is thus obtained 9 parts of a hard, white, horny polymeric material which contains a small amount of fluorine (about 3%) and whose composition corresponds approximately to the formula $(SON_2H_2)_n$. This polymer softens at about 250° C. However, it does not melt, even at 325° C.

*Example V*

A glass reactor having a capacity of 225 parts by volume is evacuated, cooled to −80° C. and charged with 0.9 part of ammonia and 12 parts of thionyl tetrafluoride ($NH_3/SOF_4$ mole ratio 0.5:1). The reactor is allowed to stand at room temperature (about 20° C.) for 16 hours, after which it is cooled and opened. After removal of the gaseous products, a white solid remains and from this is recovered, after washing with water, about 0.5 part of a powdery, white polymer, softening at 65° C., and having a composition corresponding approximately to the formula $(SOFN)_n$. The polymer is insoluble in the common organic solvents but dissolves readily in phosphorus oxychloride. It is recovered, apparently unchanged, from this solution by pouring it into water.

The polymeric products of this invention can be fabricated by hot-pressing or molding into a variety of shaped objects such as sheets, tubes, rods, tumblers, plates, dishes, valves, pipes, and the like. Thus, the poly(fluorooxosulfur nitride) of Example II is made into sheets by pressing at 150° C. and 2500 lb./sq. in., and the poly(aminooxosulfur nitride) of Example IV is formed into flat discs by molding at 250° C. and 2500 lb./sq. in. The poly (aminooxosulfur nitrides) in the massive state can be cut, sawed, drilled or otherwise machined. Structures made from both types of polymers possess high resistance to air, light, heat, water, soap, acids and chemicals such as solvents, oils, gasoline, grease, etc., and they are substantially non-flammable. Thus, they are well suited for uses in which such deleterious conditions prevail, for example as wrapping materials for oily or greasy articles such as tools or firearms, as utensils for laboratory, shop or kitchen use, as covering sheets for protection against paint, oil or ink, and the like. These polymers, e.g., that of Example I, are also useful as thread compounds for metal or plastic pipes and as sealing compounds. For such uses, their inertness towards anhydrous hydrogen fluoride makes these polymers specifically valuable for application to metallic parts, or vessels, such as cylinders, which are in contact with that chemical.

I claim:

1. A process of preparing linear inorganic polymers containing a plurality of recurring structural units of the formula

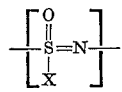

wherein X is selected from the group consisting of fluorine and —$NH_2$, which comprises contacting thionyl tetrafluoride with substantially anhydrous ammonia at a temperature between 0° C. and about 450° C., the molar ratio of ammonia to thionyl tetrafluoride being at least 0.5:1.

2. The process of claim 1 wherein the reactants are contacted in a molar ratio of ammonia to thionyl tetrafluoride within the range of 0.5:1 and 15:1.

3. The process of claim 1 wherein the reactants are contacted at a temperature between 20° C. and 200° C.

4. A linear inorganic polymer containing a plurality of the following recurring structural units

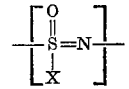

wherein X is selected from the group consisting of fluorine and —$NH_2$.

5. The polymer of claim 4 wherein X in the structural formula is fluorine.

6. The polymer of claim 4 wherein X in the structural formula is —$NH_2$.

References Cited in the file of this patent

UNITED STATES PATENTS

| | | |
|---|---|---|
| 2,876,075 | Cady et al. | Mar. 3, 1959 |
| 2,879,138 | Muetterties | Mar. 24, 1959 |